C. A. DIES.
PIPE COUPLING.
APPLICATION FILED MAY 15, 1913.

1,137,955.

Patented May 4, 1915.

Witnesses:
Raphaël Netter
C. D. Morrill

Inventor
Charles A. Dies
By his Attorney

UNITED STATES PATENT OFFICE.

CHARLES A. DIES, OF CHICAGO, ILLINOIS, ASSIGNOR TO CLAYTON MARK, OF LAKE FOREST, ILLINOIS.

PIPE-COUPLING.

1,137,955. Specification of Letters Patent. Patented May 4, 1915.

Application filed May 15, 1913. Serial No. 767,760.

*To all whom it may concern:*

Be it known that I, CHARLES A. DIES, a citizen of the United States, and a resident of Chicago, Cook county, Illinois, have invented a new and Improved Pipe-Coupling, of which the following is a specification, reference being had to the accompanying drawings, in which—

Figure 1:
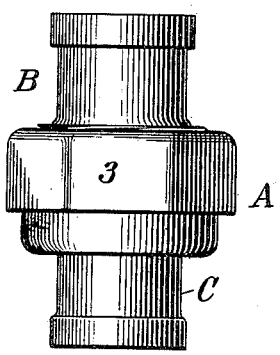
Figure 2:
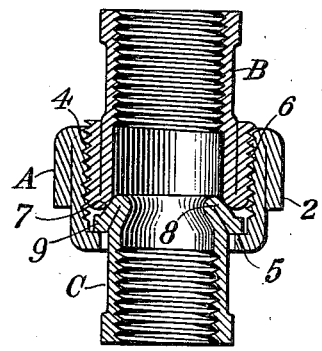
Figure 3:
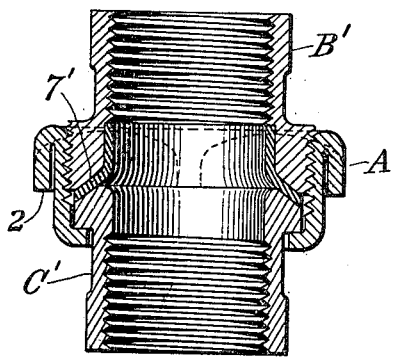
Figure 4:
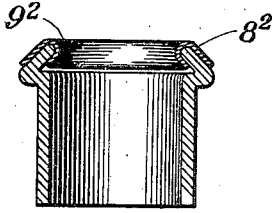

Figure 1 is an elevation of my improved coupler; Fig. 2 is a section thereof; Fig. 3 shows in section a modified form of my device, and Fig. 4 shows a modified form of the tail piece.

My invention relates to pipe couplings or pipe unions, and consists in providing a union of stamped metal, which has great strength, is exceedingly durable and adapted for very high pressures. It is also very efficient in service, and at the same time is economical from the standpoint of cost and longevity. I also provide densified and hardened bearing faces for the spud and tail piece, so formed as to eliminate the necessity of machining.

Referring to the drawings, the coupling nut A consists of a seamless metal tube having a flange or doubled over portion 2 forming its outer face and with a wrench seat 3 formed thereon. Its inner face 4 is threaded for the reception of the spud or head piece B, and has at one end a doubled-over lip or seat 5 to co-act with a flange or seat of the tail piece C.

The head piece B is made of a seamless tube with one end bent over to form a reinforcement and for a threading surface 6 for engagement with the coupling nut A, and this surface 6 is suitably threaded to co-act with the inner threaded surface 4 of the coupling nut A. The inner bearing face 7 of the reinforced end of the spud is beveled and forms a seating surface for the beveled nose 8 for the tail piece C. The tail piece C is comprised of a seamless metal tube having a bent-over flange 9, the end 8 of which is beveled to correspond to the beveled surface 7 on the spud B with which it is designed to co-act, and the outer edge of the flange 9 forms a seat against which the lip 5 of the coupling nut A is designed to bear.

In Fig. 3 I show a modified construction in which the bearing face 7' of the spud B' is covered with soft metals, such as copper or brass. This construction provides a soft metal face 7' against which the densified and hardened nose of the tail piece C' bears, so that the parts can be drawn together to make a tight joint, whether there are slight irregularities on the meeting surfaces of the spud or tail piece, although this defect is seldom present in my coupling, or whether foreign substances have become lodged on these surfaces, since the soft metal will yield and adjust itself to the irregularities or to the foreign substances on these surfaces, an action not possible with the hardened and densified surfaces of the spud and tail piece.

In Fig. 4 I show a further modification, in which the tail piece has a nose $9^2$ made of copper, brass or of other non-corrodible metal suitably clamped onto the end of the tail piece, and which forms a bearing face $8^2$ thereon.

The outwardly projecting flange or bent-over portion of the coupling nut, the head piece or the tail piece, are preferably formed by doubling over and upsetting the ends of these parts. Heavy pressure applied to the meeting faces of the spud or tail piece densifies, hardens and makes perfectly accurate these surfaces, and eliminates the necessity for machining. It is to be noted that with the spud and tail piece these reinforced portions comprise the parts which bear on each other, or on an intermediate thin metal ring, and on the coupling nut A, so that the walls of the tubes themselves, near the joint, are not weakened by any cutting away of the metal or by threading in making the coupling.

Where I refer, in the appended claims, to the bearing or seating of the hub against the tail piece, it is to be understood that these and similar terms include the constructions in which a metal gasket or ring forms the meeting face of either the hub or the tail piece against that of the opposing member of the coupling, as well as constructions in which these members bear directly against each other. Various other modifications may be made in the device which I have shown and described herein without departing from my invention.

What I claim is:

1. A pipe coupling consisting of a spud, a tail piece and a coupling nut, said members being formed from tubular blanks drawn and compressed, one end of each member being turned over upon the exterior surface of that member and compressed thereagainst as a reinforcement thereof.

2. A coupling consisting of a spud and a tail piece, said spud and said tail piece each having an end turned down over the exterior of the part to provide two seating surfaces, one of the seating surfaces of the spud being adapted to form a bearing for a seating surface of the tail piece, and a coupling nut adapted to engage the other seating surfaces of the spud and tail piece.

3. A pipe coupling consisting of a spud, a tail piece and a coupling nut, said spud having one end doubled over the exterior of the part and compressed to provide surfaces to bear on the tail piece and the coupling nut respectively, said tail piece having one end doubled over the exterior of the part and compressed to provide bearing surfaces for the spud and coupling nut respectively, and said coupling nut being provided with bearing surfaces to co-act with bearing surfaces of the spud and tail piece.

4. A stamped metal pipe coupling consisting of a spud, a tail piece and a coupling nut, the spud having a bearing surface for the coupling nut comprised of a turned-over portion lying parallel to and on the exterior of the walls of said spud, the tail piece having a turned-over lip, one face of which provides a seating surface for the spud and the other face of which provides a seating surface for the coupling nut, said coupling nut having seating surfaces for both spud and the tail piece.

5. A coupling consisting of a spud and a tail piece formed from tubular blanks, said spud and tail piece having outwardly-turned swaged and compressed reinforcing portions adjacent their meeting faces, and coupling means taking against outer faces of said outwardly-turned swaged and compressed portions for securing the spud and the tail piece together.

6. A coupling consisting of a spud and a tail piece formed from tubular blanks, said spud and tail piece having outwardly-turned swaged and compressed reinforcing portions adjacent their meeting faces, the nose of the tail piece having a densified and compression-formed seat thereon, and coupling means taking against the outer faces of said outwardly-turned swaged and compressed portions for securing the spud and the tail piece together.

CHARLES A. DIES.

Witnesses:
CLARENCE MUSH,
JOHN K. SAVILLE.